United States Patent [19]

Seppen et al.

[11] Patent Number: 4,635,609

[45] Date of Patent: Jan. 13, 1987

[54] SYSTEM AND DEVICE FOR EXHAUST GAS RECIRCULATION IN COMBUSTION MACHINE

[75] Inventors: Jan J. Seppen, Huizen; Jouke van der Weide, Rijswijk, both of Netherlands

[73] Assignee: Nederlandse Centrale Organisatie Voor Toegepast-Natuurwetenschappelijk Onderzoek, Netherlands

[21] Appl. No.: 733,509

[22] Filed: May 10, 1985

[30] Foreign Application Priority Data

May 11, 1984 [NL] Netherlands ............... 8401537

[51] Int. Cl.$^4$ ............................. F02M 25/06
[52] U.S. Cl. .............................. 123/568; 123/527
[58] Field of Search .......... 123/525, 526, 527, 575, 123/568

[56] References Cited

U.S. PATENT DOCUMENTS

| | | | |
|---|---|---|---|
| 2,831,758 | 4/1958 | Warner et al. | 123/527 X |
| 2,905,543 | 9/1959 | Schreter et al. | 123/527 X |
| 3,646,924 | 3/1972 | Newkirk et al. | 123/527 |
| 3,650,255 | 3/1972 | McJones | 123/575 X |
| 4,040,403 | 8/1977 | Rose et al. | 123/527 X |
| 4,171,689 | 10/1979 | Eheim | 123/527 X |
| 4,399,780 | 8/1983 | Lassanske et al. | 123/527 X |

FOREIGN PATENT DOCUMENTS 0075266 3/1983 European Pat. Off. .
0014416 of 1915 United Kingdom .

OTHER PUBLICATIONS

Kates, Edgar J. "Diesel and High-Compression Gas Engines", Chicago, American Technical Society, 1965, pp. 361–364.

Polytechnisch Tijdschrift/Elektrotechniek Electronica, vol. 39, No. 1, by Mr. Van der Es, dated Jan. 1983, pp. 35–39.

687 M.T.Z. Motortechnische Zeitschrift vol. 44 (5-1983), No. 5, Schwabisch Hall, Deutschland, pp. 175–179.

Vol. 44 (1983) No. 2, Schwabisch, Klasu Mollenhauer, City-Gas Engines Low Pollution Power Systems, pp. 41–44.

Primary Examiner—Willis R. Wolfe, Jr.
Attorney, Agent, or Firm—Brumbaugh, Graves, Donohue & Raymond

[57] ABSTRACT

In a spark-ignited gas engine with relatively high compression ratio of approximately $\epsilon=12$, operation takes place with relatively poor mixtures with air/fuel ratios of about $\lambda=1.6$ or over in order to reduce $NO_x$-production. At loads about approximately 70% of the (normally aspirated) nominal power, the oxygen-ratio must be reduced in order to aspirate sufficient fuel for the power demand. $NO_x$-production would steeply rise, but according to the invention exhaust gas (EGR) is recirculated at least up to nominal load, in order to maintain complete combustion at $\lambda=1.0$ and meanwhile keep $NO_x$-production low. A $\lambda$-sensor in the exhaust gases may be used for that purpose. A new venturi-based mixing device for the air-fuel-EGR is disclosed, placed upstream of the main throttle valve. The system is also applicable to diesel-gas, and straight diesel engines, with or without pressure charging. Due to the high compression ratio, thermal efficiency remains high.

8 Claims, 4 Drawing Figures

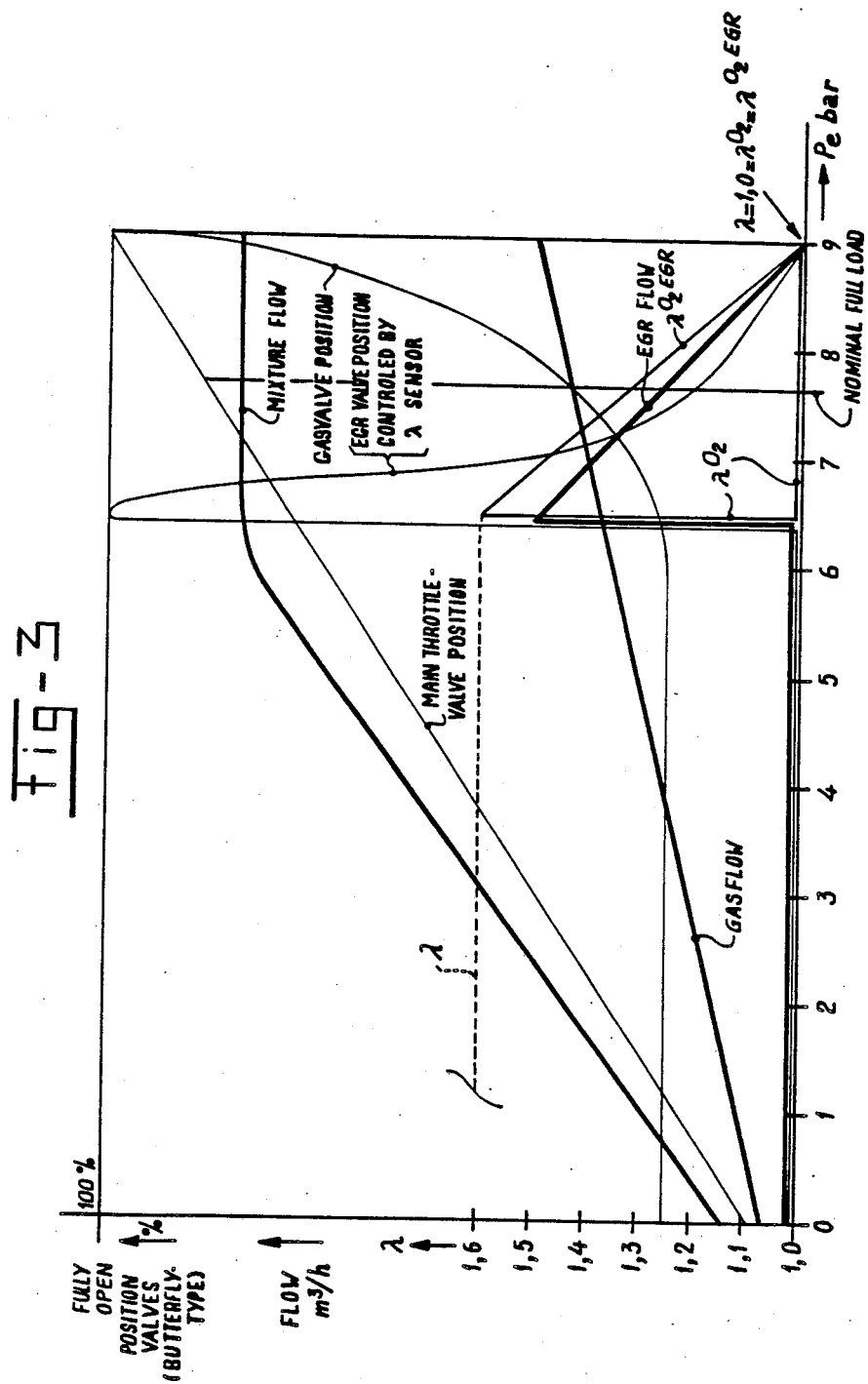

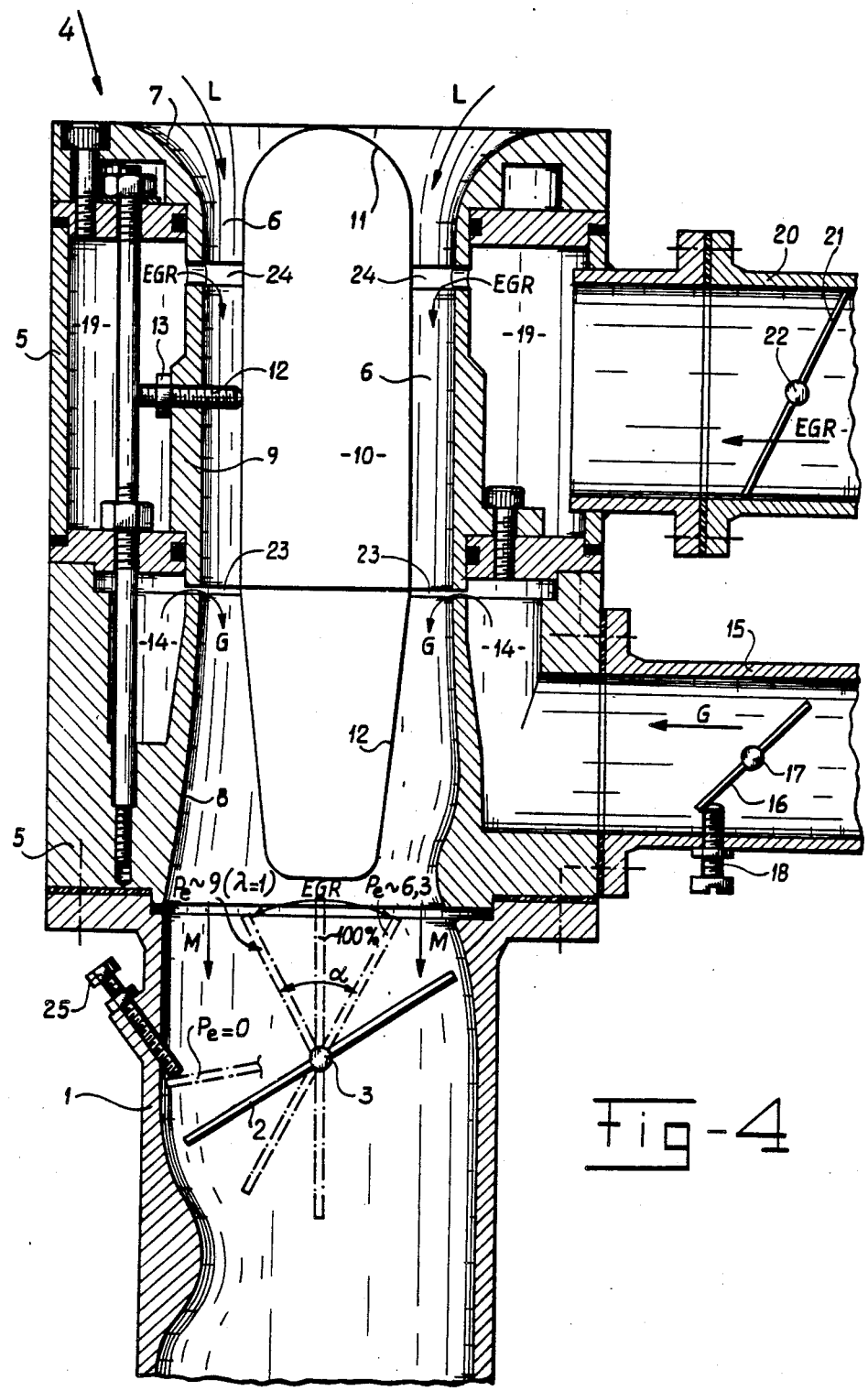

SYSTEM AND DEVICE FOR EXHAUST GAS RECIRCULATION IN COMBUSTION MACHINE

The invention relates to a system and the required device for exhaust gas recirculation (EGR) in a combustion machine, in particular in an internal combustion engine, which machine uses a gaseous fuel which, mixed with air and compressed, is ignited in the combustion chamber and burnt in order to deliver mechanical power, after the rise in pressure as a result of the temperature rise in the combustion gases, during the subsequent expansion via means suitable for this purpose, and in which in a part of the power range cooled exhaust gases from the combustion (EGR) are mixed with the incoming combustion air, with the intention, inter alia, of reducing the oxygen level in the combustion chamber to such an extent that the level of nitrogen oxides ($NO_x$) formed in the exhaust gases is reduced.

The influence of exhaust gas recirculation on the exhaust gas composition of combustion machines is being investigated everywhere, the intention mainly being to reduce the level of nitrogen oxides. The investigation generally relates to the partial-load range of the machines. EGR is in practice still little used and then still primarily in car petrol engines because many variables exert an influence on it and often improvement of the one takes place at the expense of a deterioration in something else, such as for example the specific fuel consumption of the machine. In order, in this complex problem, to bring the invention as clearly as possible to the fore, the problem and the solution are discussed for simplification by reference to the example of a spark-ignited normally aspirating gas engine. Insofar as numerical examples are mentioned, these relate to a normally aspirating four-stroke engine with a nominal speed of approx. 1,000 revolutions per minute and a bore or stroke of approx. 200 or approx. 300 mm respectively. Let it be emphatically stated, however, that the invention in principle relates not only to all gas engines but also to diesel-gas engines with ignition by means of an injection of a small amount of liquid fuel and to pure diesel engines, to the above engines with pressure charging and in certain cases even to gas turbines.

The generation of nitrogen oxides $NO_x$ as a function of air/fuel ratio $\lambda$ is shown graphically and diagrammatically in FIG. 1. No numerical values are shown on the $NO_x$ axis because these vary for the different types of engine as a consequence of their specific power, their size, the shape of their combustion chamber, their compression ratio and the like. Nevertheless the curve is valid in principle for all combustion engines, both under partial load and at full load. There appears to be a maximum generation of $NO_x$ at an air/fuel ratio of approx. 1.15, with the generation decreasing markedly for richer mixtures in the region I as $\lambda$ approaches the stoichiometric air/fuel ratio of 1.0 or over-rich mixtures. In the region II the $NO_x$ generation also decreases markedly, but less steeply, so that for 80 =approx. 1.5–1.6 a low generation again occurs.

In the following, also for the sake of simplification, natural gas will be exclusively considered as the gaseous fuel, with $CH_4$ as the most important component, because approx. 90% of all gas engines in the world use natural gas as fuel. When this fuel is used, a reproducible and reasonably complete combustion is possible at an air/fuel ratio of up to approx. $\lambda = 1.6$ with the present state of the art in a spark-ignited engine, while poorer mixtures can no longer be ignited, or no longer completely reproducibly ignited. In turn, this figure of $\lambda = 1.6$ is to some extent dependent on whether turbulence is used in the combustion chamber or not, on the shape of the combustion chamber, on the position of the spark plug, and the like, but this limiting value forms a reasonable average (on the assumption that in each cylinder there is always a reasonably homogeneous air/fuel mixture). The region I in FIG. 1 has long been the region in which the USA-school of gas engines operates. These engines in general work at full load, and often even at partial load, with an approximately stoichiometric mixture close to $\lambda = 1.0$ and have a low compression ratio $\epsilon$ of approx. 8-9 in order to avoid the risk of knocking and other uncontrolled combustion phenomena which would destroy the engine in the long term. The advantage of this is a high specific engine power output and a low $NO_x$ level at the higher loads up to to full load. A disadvantage of the low compression ratio $\epsilon$ is a low thermodynamic efficiency $\eta$, resulting in a relatively high specific consumption, and a relatively high CO level and unburnt fuel in the exhaust gases. At partial load the known engines as a rule run with $\lambda$ up to approx. 1.2, as a result of which the engines contain a relatively high level of $NO_x$ in the exhaust gases at partial load. It is also for this reason that experiments are being carried out on exhaust gas recirculation (EGR) primarily in the partial-load range.

A contrast to the American school has long been presented by the European school, which attempts to operate in the region II of FIG. 1. The intention is primarily to achieve a better specific fuel consumption. In the range of the poorer mixtures used in this case, with $\lambda$ up to 1.6, it is possible to use a high compression ratio of $\epsilon =$approx. 12. Thanks to the high value of $\lambda$, the high value of $\epsilon$ does not present a risk of knocking. The advantage is considerably higher efficiency $\eta$. Because the combustion remains reproducible up to $\lambda =$approx. 1.6, the $NO_x$ level of the exhaust gases is relatively low in the partial-load range of these engines. A disadvantage in this connection is, however, that, especially in the case of a normally aspirating engine, not enough fuel can be drawn in at a $\lambda = 1.6$ to reach the same power output as is made possible by the American school. In order to be able to be competitive in the market, it is thus essential to return to less poor mixtures up to $\lambda =$approx. 1.2 for the higher power outputs up to full load. It is true that the combustion efficiency $\eta$ remains high under these conditions, but the high maximum combustion temperatures occurring under these circumstances result in a high $NO_x$ level as can be seen from FIG. 1. The specific consumption remains relatively low.

In this connection it may also be pointed out that with natural gas as fuel, the possible presence of unburnt hydrocarbons in the exhaust gases is not of critical importance as an environmental pollutant, because $CH_4$ is already the lowest possible hydrocarbon and an incomplete combustion only produces CO and possibly some soot. Certainly, of course, incomplete combustion results in a higher specific consumption.

As an example, a number of characteristics are plotted in FIG. 2 for a normally aspirating gas engine of the previously mentioned type with a bore or stroke of approx. 200 or approx. 300 mm respectively and a speed of 1,000 revolutions per minute. It is a motor of markedly European type with a compression ratio of $\epsilon = 12$. Two curves are also shown for two different moments of pre-ignition of the spark at the sparking plug. The limits for the maximum exhaust valve temperature and the permissible combustion pressure at rated full-load power are shown by means of dotted lines in FIG. 2. For this engine the figures for the $NO_x$ level in the region of full load, which are not shown precisely, appear to be up to 2,000 ppm and above. The current target value is 1,500 ppm, while it is expected that around 1986 600 ppm will be the maximum permitted figure for the $NO_x$ level in the exhaust gases. All the curves are plotted with respect to the mean effective pressure $p_e$ in bar. The nominal full-load figure for the engine concerned is approx. 7.6 bar so that both the partial-load and the full-load regions are shown in FIG. 2. From the curves for the thermal efficiency $\eta$ it already appears that particularly in the partial-load region the moment of pre-ignition has an important effect, but the compression ratio $\epsilon$ not shown separately has a much greater effect. The curves are valid for $\epsilon=12$, while for an $\epsilon$ of approx. 8-9 according to the American school, $\epsilon$ will be lower by a further 5 to 10%.

With this kind of engine of the European type, with retention of the high figure for the thermal efficiency $\eta$ and consequently of the compression ratio of $\epsilon=$approx. 12, without loss in power, the invention nevertheless aims to achieve a markedly reduced generation of the $NO_x$ level in the exhaust gases. Theoretically the most obvious method is to remove the nitrogen $N_2$ from the combustion air. Work is in fact being done on this, but it is a difficult problem and results are not expected in near future. A different solution is therefore necessary.

According to the invention this objective is achieved in that the recirculation of the exhaust gases (EGR) takes place at least in the full-load region in a manner such that the rated full-load power output which the machine can deliver without EGR, is achievable with a $NO_x$ level in the exhaust gases which remains low.

According to the invention EGR is used even at full load so that it is possible to achieve approximately the same low $NO_x$ level as at partial load, while the specific power output can remain at the original full-load figure, so that the engine remains competitive as regards specific power output.

As already mentioned above, EGR is per se known. In this system cooled exhaust gas, which no longer contains any, or little, $O_2$ is mixed with the combustion air drawn in in a quantity such that the $O_2$ level is reduced to the figure necessary for complete combustion in a region from partial load up to and including full load, thus to $\lambda O_2 = 1.0$. The total cylinder filling remains unchanged under these circumstances and only the $O_2$ level is reduced. For the purposes of making distinction, the total $\lambda$ is then called: $\lambda O_2 + EGR$. In addition, as a result of this, a relatively slow combustion with relatively low maximum combustion temperatures and pressures takes place, despite the maintenance of the high compression ratio $\epsilon$ and an early ignition advance angle $\alpha$. This makes possible very low $NO_x$ figures of 300 ppm or less from partial load up to and including full load. The normal specific power output remains achievable without thermal overloading of the combustion chamber. However, it is theoretically possible that the CO level in the exhaust gases increases slightly, which is much less harmful than a high $NO_x$ level.

According to the European school it is possible to run without EGR up to a load in the partial-load region of approx. 70% with a $p_e$ between 6.0 and 6.5 because, according to FIG. 2, $\lambda$ is still approximately 1.5 under these circumstances and from FIG. 1 it appears that the $NO_x$ level is then still sufficiently low despite the high $\epsilon$ and the high $\eta$.

In the gas engine described above with spark ignition running on natural gas which consists mainly of $CH_4$, the engine having a compression ratio of $\epsilon=$approx. 12, a preferred embodiment of the system is characterised in that the ignition advance angle $\alpha$ has a fixed setting over the whole power range which corresponds to the optimum for the partial-load region without EGR. This fixed setting of the ignition advance angle $\alpha$ is possible in the EGR region because the engine only receives such a small supply of oxygen that, on the one hand, the gas supplied can still burn completely, but, on the other hand, in the complete filling of the cylinder a relatively slow generation of heat occurs comparable with the combustion of a poor air/fuel mixture, in which high combustion pressures and combustion temperatures do not occur, so that the risk of knocking is also low. This then makes an earlier ignition possible without EGR being necessary and possible. As a result of this not only does the combustion efficiency $\eta$ remain high, but the mechanical complication for a variable ignition moment is also avoided. This makes the engine cheaper and simpler, and removes a source of possible malfunctioning.

There is further a preferred embodiment of an engine provided with a gas/air mixer situated upstream of the main throttle valve for regulating the power output such that the mixer is of the venturi type and that the EGR inlet takes place in the same venturi upstream of the gas inlet. Per se the use of a mixer for the gas and the air of the venturi type placed upstream of the main throttle valve already has the advantage that, as a result of one and the same sub-pressure for the air and the gas in the throat of the venturi, the air/fuel ratio remains approximately constant at the preset value over the whole of the control range. By also now siting the EGR inlet in the throat, the same applies to the air/EGR ratio as regards the actual venturi. Nevertheless, the EGR inlet should be separately controllable, and for this purpose according to a preferred embodiment a normally aspirating engine which, up to and including the partial-load region is operated with a relatively poor air/fuel mixture with a $\lambda$ between 1.4 and 1.6, is characterised in that at a partial load of approx. 70% and above and at a $p_e$ of approx. 6 bar, the EGR inlet is fully opened, so that $\lambda O_2$ becomes equal to 1.0 for a $\lambda O_2 + EGR$ of approx. 1.6 and that at higher load the EGR valve is gradually closed, so that $\lambda O_2$ remains equal to 1.0 with $\lambda O_2 + EGR$ decreasing from 1.6 to 1.0, until at an (over)load of the engine at a $p_e$ of approx. 9 bar (with $CH_4$ as fuel), the EGR valve is again closed because $\lambda O_2 + EGR$ has become equal to $1.0 = \lambda O_2$. It will be clear that for each particular type of engine the mixer has to be so dimensioned that with the EGR valve fully opened, $\lambda O_2$ just becomes equal to 1.0 for a partial load of approx. 70%, with the $\lambda O_2 + EGR$ remaining equal to the $\lambda$ of approx. 1.6 appropriate at the lower partial load without EGR. This means that for a load above this figure, the main throttle valve no longer has any effect and the engine always receives a complete cylinder filling consisting of the required quantity of gas with precisely the quantity of fresh air being drawn in for there to be sufficient $O_2$ to obtain a $\lambda O_2$ equal to 1.0 and with the deficit for a complete cylinder filling being made up with recirculated exhaust gas. From the above is derived a further preferred embodiment in which the control of the power output in the partial-load region takes place with the normal main throttle valve until the EGR valve opens and the gas inlet valve remains in a fixed throttle position, which preferred embodiment is characterized in that in the power region in which the EGR valve is opened, the power output is controlled via the gas valve, that the main throttle valve is opened to such an extent that further opening has no further influence on the filling of the engine and that in this region the opening of the EGR inlet valve is controlled, for example, by an $O_2$ sensor situated in the exhaust gases or by a cam disc or an electronic equivalent, so that the $O_2$ level in the exhaust gases is kept at or near O ($\lambda O_2 = 1.0$).

As already stated earlier, FIG. 2 shows a number of characteristic curves for the gas engine without EGR considered as an example. The influence of the EGR is, as stated above, shown diagrammatically by means of dash-and-dot lines in FIG. 2. In the case of the engine concerned it is desired to use EGR at a $p_e$ of approx. 6.3 bar and above. One of the reasons for the choice of this value for the mean effective pressure $p_e$ is the fact that the $NO_x$ level at partial load with this $p_e$ increases to the future limiting value of approx. 600 ppm, while it appears from the lower graph that under these circumstances the $\lambda$ without EGR is still between 1.5 and 1.6. In the power region with EGR the $NO_x$ level will remain more or less constant at a low figure, which is shown for guidance by means of a dash-and-dot line in the top graph. When the EGR valve opens, the $NO_x$ level will in any case still decrease slightly to a very low value, because the $\lambda O_2 = 1.0$ regulation then comes into operation.

Thanks to the delayed combustion process in the cylinder in the EGR region already described earlier, the maximum combustion pressure will also become lower, despite the early ignition advance angle of $\alpha = 14°$, which is again shown diagrammatically with a dash-and-dot line in the curves for the maximum combustion pressure P. In the $\lambda$ curves the EGR region is also shown, specifically a $\lambda O_2$ of 1.0 because this is taken care of by the $\lambda$ sensor or the like. The $\lambda$ curves of the partial-load region continue unaffected in the EGR region, where they are termed $\lambda O_2 + EGR$ curves, because the main throttle valve is no longer effective in this region and the engine always receives a full cylinder filling, now consisting, however, of a mixture of the stoichiometric gas/air mixture necessary for the power, made up with EGR. As shown in FIG. 3, but not in FIG. 2, the extensions of the $\lambda$ EGR curves intersect the $\lambda = 1.0$ line at a $p_e$ of approximately 9 bar. This means that this is the maximum power output which the engine under consideration should be able to deliver at complete cylinder filling with a stoichiometric mixture. In practice, however this means a heavy thermal overloading of the parts surrounding the combustion chamber, such as piston and exhaust valves, for virtually all engines. In connection with the thermal load, the normally aspirated engines are in general rated for continuous full-load operation up to a $p_e$ of approx. 7.6 bar. Depending on the material used, the more or less extensive measures taken for cooling, the absolute size of the engine and its speed, the full-load $p_e$ is variable between approx. 7.0 and 8.0 bar. In some cases a short-term overload, for example to take up loading peaks, is possible up to a maximum of 9 bar. In the foregoing and in what follows mention is constantly made of a $\lambda O_2 = 1.0$ sensor. However, it may sometimes be necessary with extremely high requirements as regards $NO_x$ level to work with an "over-rich" mixture with $\lambda < 1.0$. A modified sensor is then necessary. The advantage is then a still lower $NO_x$ level, but at the expense of a somewhat higher CO level in the exhaust gases and a somewhat higher specific fuel consumption.

In FIG. 3 a part of what is described above is plotted graphically, but for the explanation reference is made to the following figure description because the explanation cannot be given without knowledge of FIG. 4, which describes a preferred embodiment of a usable gas/air-/EGR mixer and a part of the control means for it. A preferred embodiment of the mixer is also explained in the figure description.

It should further be pointed out that for the applications of EGR in the partial-load region known hitherto, the EGR is supplied downstream of the main throttle valve because there is a considerable sub-pressure after the main throttle valve in the partial-load region, which sub-pressure readily sucks in the EGR. In the known installations a gas/air mixer of the venturi type is then as a rule also absent.

From the foregoing it will be evident that the application of EGR is most effective in the region where $\lambda$ is smaller than approx. 1.6. Again depending on the type of engine the $p_e$ above which EGR is useful, will in practice vary between 5.5 and a maximum of approx. 7.0. It will further be clear that use of the $O_2$ sensor in the exhaust is not strictly necessary, but that for a given engine type for which the characteristics are known, the EGR inlet can also be controlled by means of a prefixed characteristics-field, for example by means of a mechanical cam or an electronic programme. The preferred embodiment described with an $O_2$ sensor, however, functions ideally and is capable of gradually compensating to a large extent for deviations which may occur, for example as a result of de-adjustment and deterioration, with the aim of keeping the $NO_x$ level of the exhaust gases low as long as possible.

An advantage associated with the $O_2$ sensor is also of considerable importance. In gas engines it may happen that the ignition of the gas/air mixture now and then, regularly or constantly fails in one or more cylinders, which is often difficult to be observed especially in multi-cylinder engines with a large power output surplus. If now the EGR valve should be fully open or is unsteady and also inclined to open further than is appropriate for the $p_e$ delivered in the EGR operating region of the engine, then this is a sign that there is now and then or regularly $O_2$ present in the exhaust gases which there should not be. This is a very sensitive indication of the fact that one or more cylinders are now and then or regularly failing to ignite. This phenomenon can readily be detected and given an early warning and safeguards against difficulties with the ignition.

In the description of the figures below the invention and a preferred embodiment of a mixer are explained in more detail.

Figure 2:
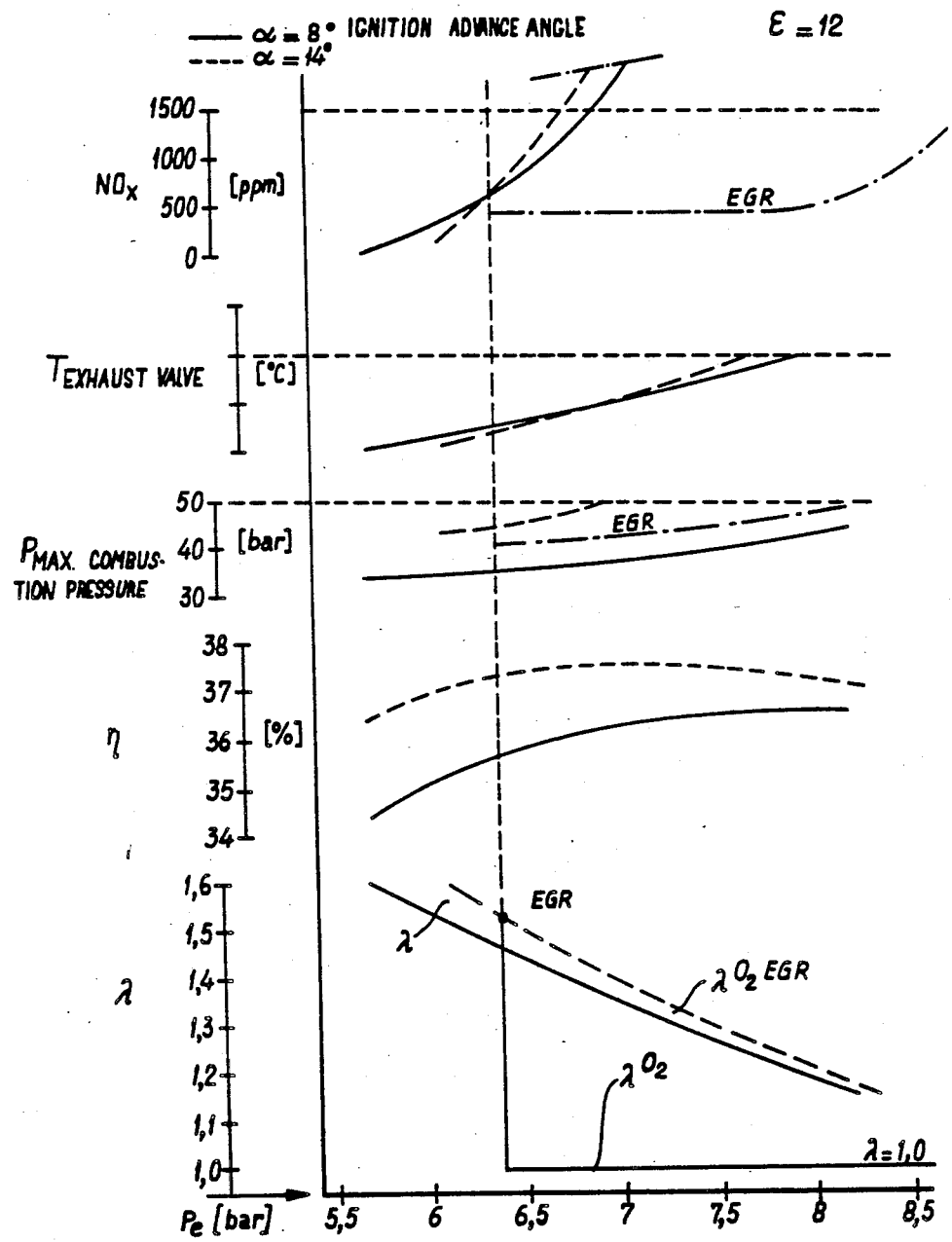
FIG. 2 shows a number of relevant characteristics for the invention, such as air/fuel ratio $\lambda$, thermal efficiency $\eta$ and $NO_x$ generation, plotted against the mean effective pressure $p_e$ in the cylinder on an arbitrary known gas engine. The influence of the exhaust gas recirculation (EGR) at higher power outputs is also shown diagrammatically.

FIG. 3 again shows diagrammatically the most important characteristics of the EGR according to the invention, used in the engine according to FIG. 2 and with regulation and a mixer according to FIG. 4;

FIG. 4 shows in longitudinal cross/section a gas/air-/EGR mixer according to the invention.

Figure 1:
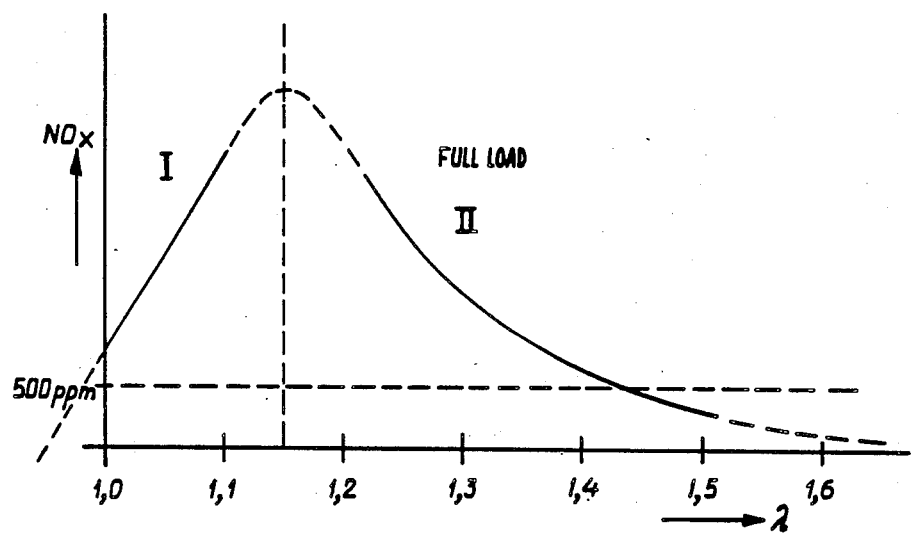
FIG. 1 shows the basic relationship between the $NO_x$ generation of a normally aspirated gas engine plotted against the air/fuel ratio $\lambda$.

The FIGS. 1 and 2 have in substance already been discussed in the above introduction. It may only be stated further in connection with FIG. 1 that the maximum for the $NO_x$ level can vary considerably, depending on engine type, design, speed, etc. It is therefore shown by means of a broken line. For guidance as to the order of magnitude of the $NO_x$ level a line is shown for 500 ppm in FIG. 1. From this it is evident that the maximum of the $NO_x$ level can rise to several thousand ppm for the known engines (without EGR and without other possible special measures). Moreover, the ends of the curve, both in region I and II, are also shown as a broken line, because even here the differences are large depending on the various types of engine. However, it is important in this connection that the $NO_x$ levels are low for virtually all types of engine.

On the rich-mixture side in the region I a lower $NO_x$ generation can be simply explained: first of all the fuel burns and uses up the oxygen necessary to do this. If there is little or no excess of oxygen, then, despite high peak temperatures being reached at which $NO_x$ could per se be produced, little or no $NO_x$ will be able to be formed due to the lack of oxygen. As already stated earlier, the shape of the graph in FIG. 1 is valid for $\lambda$=approx. 1.15 with a maximum $NO_x$ level virtually independent of the type of engine and the speed and even of the load.

FIG. 3 has already been decribed above as regards its fundamentals. The manner, however, in which the different medium flows were obtained as a function of the valve positions in order to obtain the required $\lambda$ characteristic is explained at the same time as the description of the device according to FIG. 4.

In FIG. 4 a preferred embodiment of a gas mixer is shown which fulfills the requirements set and the coupling of the various valves is described schematically. The engine, which is not shown, is provided with an intake manifold 1 in which a central main throttle valve 2 is situated in the normal manner. As usual, this throttle valve is designed as a butterfly valve and rotates around a spindle 3 which is brought to the outside. For zero load the throttle valve 2 is almost fully closed and generally has an adjustable stop 25 for this setting. A gas engine is consequently stopped by means of another gas shut-off valve (not shown). Upstream of the intake pipe 1 is situated the mixing device according to the invention, which is indicated in its entirety by 4. The mixing device consists substantially of a casing 5 of cylindrical shape assembled from a number of parts and has a central passage 6. On the inlet side the passage 6 has a streamlined constricting radius (7) around its entire circumference. On the outlet side the passage 6 gradually widens out (8) to the internal diameter of the intake pipe 1. Between the inlet radius 7 and the expanding outlet 8 there is a relatively long, mainly cylindrical section 9. This shaping already provides the base of the venturi shape for the passage 6. However, the effect of the venturi is considerably intensified by a cylindrical displacement body 10, provided with a streamlined radius 11 on the inlet side and a conical constriction 12 on the outlet side, being fitted centrally in the passage. The passage 6 of the mixer casing 5 has thus become an annular venturi. The displacement body 10 is held centrally in place in the passage 6 by a number of radially disposed fixing elements. One of these is shown diagrammatically in the form of a stud 12 with a locking nut 13.

The mixer casing 5 is provided with two annular chambers which are separated from each other. Chamber 14 acts as the gas inlet G and is connected to a gas supply pipe 15 on the outer circumference of the mixer casing 5. In the gas supply pipe there is also a butterfly valve 16 which can be adjusted in the usual manner about a spindle 17 brought to the outside. The gas valve 16 cannot be fully closed since it comes to rest against a diagrammatically shown adjustable stop screw 18. The other annular chamber 19 is connected to a supply pipe 20 for the exhaust gas recirculation (EGR) via the outer circumference of the mixer casing 5. In the EGR supply pipe there is also a butterfly valve 21 which can be rotated around an adjustment spindle 22 brought to the outside. The EGR valve 21 can shut off the EGR supply completely.

Each of the annular chambers 14 and 19 is open to the cylindrical section 9 of the venturi passage 6 via a circumferential slot of considerable length. The gas G can thus be drawn in through the ring slot 23 as shown by the arrows by the passing accelerated air flow L.

In the subsequent expanding section of the venturi very homogeneous mixing takes place between the gas G and the air L, as a result of which the combustible gas/air mixture is produced which is shown by the arrows M. Similarly if the EGR valve 21 is opened, exhaust gas can be drawn along with the accelerated air flow L via the ring slot 24. The EGR inlet takes place upstream with respect to the gas inlet G. A characteristic of this type of mixer with elongated venturi 9 is that, regardless of the quantity of mixture M drawn in and consequently regardless of the position of the main throttle valve 2 and of the engine speed, the mixing ratio of the quantity of air drawn in and the quantity of gas remains almost constant. It makes no difference to the quantity of gas drawn in whether air only or a mixture of air and EGR is flowing past the point of the supply slot 23. The same also applies to the EGR/L ratio, which remains constant regardless of the instantaneous engine load and the speed of the engine, insofar as the EGR valve 21 allows a flow of EGR. The above-mentioned constant ratios are possible due to the fact that the gas and any supply of EGR are both situated upstream of the main throttle valve. They are therefore determined exclusively by the characteristics of the mixer 4 which is designed as a venturi. In a large number of known engines the gas supply takes place after the main throttle valve, as a result of which the air/fuel ratio is strongly speed- and load-dependent. The same applies to the EGR supply, insofar as this is already applied in the partial-load region.

As regards the remainder of the design of the mixer this does not have to be explained in more detail to understand the present invention. It is such that the various chambers and spaces are accessible for assembly and disassembly. It may only be pointed out that in the cooled EGR current there may be condensate and for this reason it is useful to provide the EGR chamber 19 with a draining device (not shown) such as, for example, a "water syphon".

As regards the operation the essence of the characteristics of the mixer has already been described in the above description. Now follows the explanation of the control, also with reference to FIG. 3. The main throttle valve 2 is shown by continuous lines in a partial-load position. Under these circumstances the cycle temperatures in the combustion chamber are so low that no $NO_x$ is produced at all so that no EGR supply is necessary. The EGR valve 21 is therefore fully closed, while the gas valve 16 is up against the adjustable stop 18 in the fixed partial-load position as shown. In the whole of the partial-load region the gas valve 16 rests against the stop 18. In the zero-load position, for which the average effective pressure $p_e$ is equal to 0 bar, the main throttle valve 2, as shown by the broken lines in FIG. 4 for $p_e=0$, is almost fully closed and rests against an adjustable stop 25.

Depending on the type of engine and its speed, the $NO_x$ level rises with increasing load until at a $p_e$ of approx. 6.3, or a load of approx. 70% of the rated load, it becomes so high that the acceptable limit for the $NO_x$ level is reached. The position of the main throttle valve 2 corresponding to this is shown by broken lines in FIG. 4 with $p_e=$ approx. 6.3 bar. The main throttle valve 2 together with the intake channel 1, is therefore so designed and dimensioned that up to the partial load position, corresponding to $p_e=6.3$ taken as an example, the control behaves approximately linearly as shown by the curve for the mixture flow in FIG. 3. If the main throttle valve 2 is further opened to the position for the maximum achievable output power of the engine with a $p_e$ of approx. 9, adjustment of the main throttle valve 2 has no further effect on the mixture flow as FIG. 3 shows. Meanwhile the throttle valve passed through angle $\alpha$, see FIG. 4. Approximately in the centre of the angle shown is the position corresponding to the rated output power of the engine, indicated by 100%. The angle $\alpha$ also specifies the EGR region, that is to say that in this control position of the main throttle valve 2 more or less exhaust gas EGR is recirculated.

In order to keep the power output control of the engine simple, it must take place exclusively via the control spindle 3 of the main throttle valve 2. However, as described above, in the EGR region the effect of the main throttle valve on the engine output power is zero. There is therefore a coupling, which is not shown, between the main throttle valve 2 and the gas valve 16, for example by means of a cam disc, which is such that over the EGR range of the main throttle valve, the gas valve 16 is gradually opened further. This is shown in FIG. 3 by the curve labelled gas valve position. It is also evident from FIG. 3 that the gas flow under these circumstances continues to increase approximately linearly. In the partial-load region of $p_e=6.3$, this is due to the action of the venturi already described earlier and in the EGR region, with a constant mixture flow through the venturi, it is the result of the gas valve 16 opening further.

In the example given, on passing $p_e=6.3$ the EGR valve 21 is fully opened so that the oxygen content of the mixture M drawn in is reduced to a value such that $\lambda O_2$ is equal to 1.0. The EGR valve is dimensioned to achieve this, it being a function, inter alia, of the gaseous fuel used, or there is a maximum stop fitted (not shown) which limits the maximum opening of the EGR valve 21. The EGR valve 21 is furthermore exclusively controlled by a $\lambda$ sensor in the exhaust from the engine. This sensor is of such a type that if oxygen is present in the exhaust gases it emits a signal and has its toggle point at $\lambda=1.0$. Such $\lambda$ sensors have proved reliable and are commercially available. (There are also $\lambda$ sensors available with a toggle point at $\lambda=1.1$ or $=0.9$). As the main choke valve 2 is further opened in the EGR region, and consequently also the gas valve 16, the mixture M drawn in will, for the given quantity of EGR also drawn in, tend to become too poor in $O_2$, so that the $\lambda$ sensor no longer measures any $O_2$ in the exhaust gases. It will therefore emit an instruction as a result of which the EGR valve is closed until $\lambda O_2=1$ is again reached. As already stated previously, the $\lambda O_2+$EGR is always constant under these circumstances because the engine always receives a 100% cylinder filling. In FIG. 3 the associated flows and valve positions are shown, as is the achievable $\lambda$.

In the example given all the oxygen present in the air L will be needed at $p_e=9$ bar for the combustion of all gas G supplied. At that instant, therefore, no further EGR must be supplied because $\lambda O_2$ then becomes equal to $\lambda O_2+$EGR and equal to $\lambda=1.0$. Even at this maximum loading of the engine the $NO_x$ level is very low because all the oxygen is needed for combustion of the gas and no oxygen is left to combine with the nitrogen. This loading also means a heavy thermal overload of most engines so that the rated full-load power output must usually be set considerably lower at a $p_e$ of approximately 7-8 bar, as in the case of the engine according to the present example at 7.6 bar.

With the object of ensuring reliable operation of the engine in the region with the maximum thermal load, because the control of the EGR valve 21 is sensitive to signals from the $\lambda O_2$ sensor, it may be advantageous for the EGR valve 21, shown as a single valve, to consist of at least two valves connected in series with respect to the EGR flow, at least one of which is operated by one or more cam discs for the main open/close regulation, and the other via an electrical/electronic operating device controlled by the $\lambda O_2$ sensor for the fine adjustment.

It will be evident that in essence one and the same mixer and one and the same control system can be used to control the $NO_x$ level in the exhaust gases of a diesel-gas engine. The only essential difference from a spark-ignited gas engine consists in the fact that instead of using a spark for the ignition, a small quantity of liquid diesel fuel is injected each time at the precise instant. This type of engine generally operates in the partial-load region with a poorer air/fuel mixture than a spark-ignited gas engine because the relatively large number of igniting liquid fuel droplets form an equivalent number of combustion centres. A $\lambda$ of 2 and higher is therefore possible without an excessive quantity of unburnt gas being found in the exhaust. The compression ratio $\epsilon$ can be considerably higher under these circumstances without the risk of knocking, which higher compression ratio is also necessary to ensure self-ignition of the diesel fuel. Only in the low partial-load region there will have to be some throttling of the quantity of air drawn in so that the air/fuel mixture does not become so poor that the combustion propagates itself too slowly or can no longer propagate itself at all from the igniting liquid diesel fuel droplets. In the higher load region it is possible and essential to use EGR, just as described above for spark-ignited gas engines.

It will be clear that the above applies in principle also to pure diesel engines and to engines with pressure charging.

By reason of the generally valid FIG. 1, some EGR at higher loads will be able to reduce the $NO_x$ level even in the case of a pure diesel engine. However, in order to prevent smoke formation, it will not be possible to reduce the air/fuel ratio to $\lambda O_2 = 1.0$ in the case of a diesel engine, but, depending on the type of engine, to a somewhat higher value for $\lambda O_2$.

Meaning of the various designations of $\lambda$ in the mixture M:

$$\lambda = \text{(known and conventional)} \frac{(L/B) \text{ actual}}{(L/B) \text{ stoichiometric}} \text{ ratio}$$

(stoichiometric $\lambda = 1.0$)

$$\lambda O_2 = \text{ratio of: } \frac{O_2 \text{ draw in}}{O_2 \text{ needed for stoichiometric combustion of the fuel } G \text{ supplied}}$$

$\lambda O_2 + EGR = $ ratio of:

$$\frac{(\text{air}(L) + EGR)/B}{(L/B) \text{ stoichiometric}} \text{ (equal to } \lambda \text{ in } EGR \text{ operation-mode)}$$

where

L, B, G are the quantities by weight of air, fuel and gas respectively $O_2$ is the quantity by weight of oxygen in the air.

We claim:

1. In an internal combustion engine which includes a main throttling valve, and which is supplied with air and fuel gases and which produces exhaust gases a device for reducing the $NO_x$ content in the exhaust gaes comprising a fuel/air mixing means of the venturi type located in the engine upstream of the main throttling valve characterized in that the passage of the venturi is cylindrical and includes a first inlet into the passage for recirculated exhaust gases and a second inlet into the passage for fuel gases downstream of the first inlet, and separately adjustable exhaust gas and fuel gas control valve means in the first and second inlets, respectively.

2. The device of claim 1 further including a cam disc including means for coupling the fuel gas valve means to the main throttle valve and means for controlling the exhaust gas valve means including an oxygen sensing means located in the path of the exhaust gases of the engine.

3. The device of claim 2 further characterized in that the exhaust gas valve means includes a pair of valves in series in the path of the recirculated exhaust gases of which one serves as the main control and the other of which serves for fine adjustment control and is controlled by said oxygen sensing means.

4. An internal combustion engine system which uses a gaseous fuel, which mixed with air, is ignited in the combustion chamber of the engine and burnt to deliver power and which is designed for low levels of nitrogen oxides ($NO_x$) emissions in the exhaust even with mixtures of air/fuel ratios normally characterized by high level of emissions and with relatively high compression ratios for high thermodynamic efficiency at least over the full load portion of the power range comprising:

an internal combustion engine including a main throttle valve;

a fuel/air mixing means located upstream of the main throttle valve including a fuel gas inlet and an exhaust gas inlet; and means for supplying recirculated exhaust gas relatively free of oxygen to said exhaust gas inlet such that the same full load power output the engine can deliver without exhaust gas recirculation is achieveable with a low level of nitrogen oxides emissions.

5. System according to claim 4, in which the engine is a spark-ignited gas engine characterized by an ignition advance angle running on natural gas which consists chiefly of $CH_4$, with a compression ratio of $\epsilon = $ approx. 12, characterized in that the ignition advance angle ($\alpha$) has a fixed setting over the whole power range up to the rated power output, which corresponds to the optimum for the partial-load range without EGR.

6. System according to claim 4 characterised in that the mixing means (4) is of the venturi type (7, 8, 9, 10) and that the EGR inlet (24) takes place in the same venturi (9) upstream of the gas inlet (23).

7. System according to claim 6, in which the engine is normally aspirated and up to and including the partial-load range is operated with a relatively poor air/fuel mixture with $\lambda = $ approx. 1.6, characterised in that, at a partial load of approx. 70%, corresponding to an average effective pressure of $p_e = $ approx. 6 bar, the EGR inlet (21, 24) is fully opened so that $\lambda O_2 = 1.0$ with a $\lambda O_2 + EGR = $ approx. 1.6, and that at higher load the EGR valve (21) is gradually closed so that $\lambda O_2$ remains $= 1.0$ for $1.0 > \lambda O_2 + EGR < 1.6$, until at an (over)-load with $p_e = $ approx. 9 bar, the EGR valve (21) is again closed because $\lambda O_2 + EGR = \lambda O_2$ and thus has become equal to 1.0.

8. System according to claim 7 further including a gas valve for controlling the amount of gas supplied to the mixing means, and EGR valve for controlling the amount of exhaust gases supplied to the mixing means, and an $O_2$ sensor for sensing the amount of oxygen in the exhaust gases in which control of the power output in the partial-load range (until the EGR valve opens) takes place by means of the normal main throttle valve and the gas valve remains in a fixed throttling position, characterised in that in the power range in which the EGR valve (21) is opened, the power outlet is controlled with the gas valve (16), the main throttle is controlled with the gas valve (16), the main throttle valve (2) being opened to such an extent that further opening has no influence on the filling of the engine, which is then maximum, and that in this range the opening of the EGR inlet valve (21) is controlled by the $O_2$ sensor situated in the exhaust gases, which keeps the $O_2$ level essentially at O ($\lambda O_2 = 1.0$), as a result of part of the air (L) taken in being replaced by EGR.

* * * * *